United States Patent [19]

Crano

[11] 4,028,937

[45] June 14, 1977

[54] NONDESTRUCTIVE TESTING OF TIRE WEAR

[75] Inventor: Richard N. Crano, Akron, Ohio

[73] Assignee: The General Tire & Rubber Company, Akron, Ohio

[22] Filed: Aug. 24, 1976

[21] Appl. No.: 717,301

Related U.S. Application Data

[63] Continuation-in-part of Ser. No. 578,564, May 19, 1975, abandoned, which is a continuation of Ser. No. 457,041, April 1, 1974, abandoned, which is a continuation of Ser. No. 288,210, Sept. 11, 1972, abandoned.

[52] U.S. Cl. .................................................. 73/146
[51] Int. Cl.² ......................................... G01M 17/02
[58] Field of Search ................... 73/146, 146.2, 9

[56] References Cited

UNITED STATES PATENTS

| 2,313,156 | 3/1943 | Kraft, Jr. .............................. 73/146 |
| 3,735,344 | 5/1973 | Weintraub et al. ................... 73/146 |

*Primary Examiner*—Donald O. Woodiel

[57] ABSTRACT

A method and apparatus are provided for qualitatively determining relative tire wear of pneumatic tires. The shoulder ribs and adjacent ribs of the tire tread of the tire are radially, preferably statically loaded preferably against a movable follower member positioned in an opening in a bearing surface against which the remaining tire tread is radially loaded. The follower member is pivoted to prevent motion radial to the tire and attached to deflection members on which are mounted at least one strain gauge. The lateral deflection of the tread ribs adjacent to the shoulder portions are thus measured. Tires associated with the greater of the lateral deflection under radial load have a correspondingly greater wear rate.

10 Claims, 3 Drawing Figures

NONDESTRUCTIVE TESTING OF TIRE WEAR

FIELD OF THE INVENTION

This application is a continuation in part of application Ser. No. 578,564, filed May 19. 1975, now abandoned, which in turn, is a continuation of Ser. No. 457,041 filed Apr. 1, 1974, now abandoned which is a continuation of Ser. No. 288,210 filed Sept. 11, 1972, now abandoned.

The present invention relates to a method and apparatus for the predictive determination of tread wear for various tire constructions by nondestructive static testing.

BACKGROUND OF THE INVENTION

It is generally well-known that the lack of tire uniformity has a substantially adverse effect upon the ride and handling characteristics of the vehicle upon which they are mounted. These tire nonuniformities include, or have been variously referred to as lateral force variations, radial force variations, concentricity effect, radial runout and the like. These nonuniformities can be determined by dynamic testing with or without radial loading of the tire by measuring variations in the radius, measuring the first and second harmonics produced by rotation of the tire, and the like. Illustrative of some of these methods, and apparatus for their effectuation are U.S. Pat. Nos. 3,490,277, 3,450,442, 3,577,780 and 3,589,182. While these methods and apparatus are adequate for the nondestructive determination of non-uniformities within test tires, they do not provide either a method or means for determining the probable wear between various types of tire constructions, such as bias ply construction, bias belted, and radial ply construction, or between various tread designs of tire of the various types of construction.

A predictive method and means for determining tire wear is extremely useful in providing design information for tire construction of various types or modifications to arrive at a tire design wherein optimum mileage can be obtained. Presently, reliable data on tire wear can be determined only be means of usage, either actual or from test wear from a dynamic rotating tire. In both cases the tire must undergo some form of consumable usage such as in the test fleet. Furthermore, the usage of the tire to determine actual wear is not only expensive, but requires a long period of time between actual construction of the prototype tire and the results from the tests. Accordingly, it would be extremely advantageous to have a predictive method for the determination of tread wear which could be used for further design work, modification or changes.

SUMMARY OF THE INVENTION

The present invention is addressed to a method and a means for the predictive determination by nondestructive, preferably static testing of tires to determine the relative qualitative wear of various types of tires or tread design. More particularly, the present invention provides a means and method for determining static lateral rib deflection of pneumatic tires to provide tread wear data in a qualitative manner. By static testing is meant that the tire is not rotated at the time of testing albeit the radial loading applied may be static or dynamic.

It has been found that a primary factor of tread wear occurring in passenger car tires is the relative motion in the lateral direction between the tread ribs and the roadway. That is, as a tire is radially loaded, the tread ribs move perpendicular to the tire circumferential centerline. It has been further found that there existed a high correlation between tread wear and lateral tread rib motion, and that a tire having high lateral tread rib displacement had greater wear propensity than did a tire having little lateral motion. It has been suprisingly found, however, that footprint pressure measurements did not correlate with tread wear.

Moreover, the average lateral displacement of the ribs at the outside of the tire, for example the outer ribs and next adjacent ribs, was found to provide extremely good predictive measurements of tire wear; whereas the correlation between the lateral motion of the center ribs and tread wear was lacking. Accordingly, the present invention is directed to a method for determining by nondestructive, preferably static means the average lateral deflection of the outer shoulder ribs and oher ribs adjacent to the shoulder ribs of the tire.

To provide an accurate means for measuring the lateral displacement of the tread ribs of the tire, the present invention provides an apparatus comprising a transducer assembly. The apparatus of the present invention includes a flat, tire bearing surface plate having an opening therein. Attached to the bottom of the bearing plate are a pair of depending fixed spaced apart bearing members located on either side of the opening and spaced away therefrom. Rigidly attached to and depending from each of the spaced bearing members are a pair of deflection members preferably of curved substantially "U-shape". Each of the deflection members are additionally secured to a pivoted follower member positioned within the openings of the flat bearing surface, and has a surface in planar alignment with the bearing surface of the flat plate. The pivot allows for translation of lateral movement but prevents movement in a radial direction to the tire. The mounting means for each deflection member are located within the same plane. To at least one of the deflection members is mounted a strain gauge or gauges for measuring the amount of deflection produced by the movable follower member. As the tire is radially loaded against the flat plate, the movable member contacts a selected tread rib and follows its lateral displacement. The amount of deflection is proportional to the strain measured by the strain gauge from the deflection members.

PRESENTLY PREFERRED EMBODIMENTS

Figure 1:
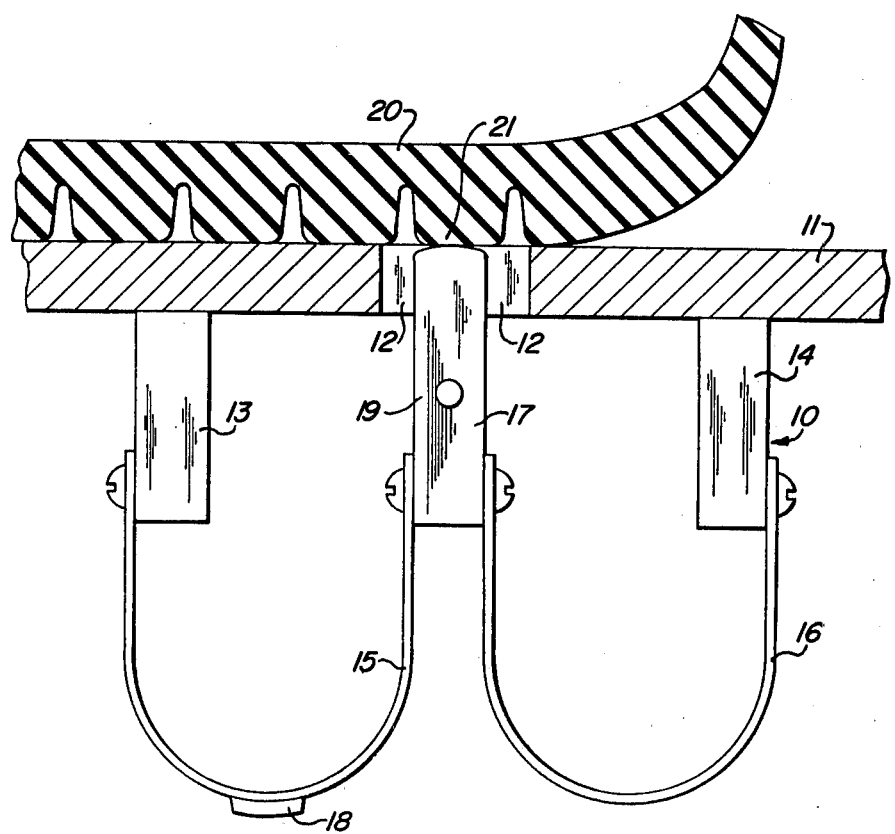
FIG. 1 is an elevation of the apparatus preferred for measuring lateral deflection of the tire ribs.

Referring to FIG. 1, transducer 10 comprises a flat bearing surface plate 11 having an opening 12 therein. Opening 12 is preferably about one inch in width by about one and one-fourth inches in length. Bearing surface plate 11 is preferably fixed to support means, now shown, adequate to support the plate under loading up to at least 2000 pounds. Depending from the bottom of bearing plate 11 are a pair of first and second bearing members 13 and 14. Bearing members 13 and 14 are located on either side of opening 12 and have mounted thereto first and second deflection members 15 and 16, respectively. Deflection members 15 and 16 are preferably identical, and are mounted to the outside of the respective bearing members. Moreover, it is preferred that deflection members 15 and 16 be of substantially U-shape. A movable following member 17 is positioned within opening 12 and includes a top surface approximately ½ inch by 1 inch lying in the same plate as flat bearing surface plate 11. Movable member 17 is securely mounted to deflection members 15 and 16. The means for fastening deflection members 15 and 16 to respective bearing members 13 and 14 and to following member 17 preferably are positioned to lie in the same plane. A strain gauge or gauges 18 is mounted to deflection member 15 or 16 preferably, as shown, at the apex of the U-shape, and is electrically connected to a means (not shown) in a manner well-known in the art to measure the strain produced thereby. Following member 17 is fixed against movement radial to the tire by pivot pin 19. Pivot pin 19, however, does allow for translation of lateral movement to deflection member 15 and 16. Pivot pin 19 is fixed in a member bearing plate 11 not shown.

In the measurement of lateral deflection, a tire tread 29 is positioned on the surface of flat bearing plate 11 of transducer 10. The tire tread is loaded against the flat plate and the movable following member 17 contacts a selected tire rib 21 and follows its lateral displacement. Prior to loading, the tire is preferably inflated to its preferred pressure, for example 24 psi. The tire is then radially loaded to its rated load and the lateral rib movement is measured at its rated loading. Each rib to be measured is measured individually and in sequence. The measurements are preferably taken at two locations on each rib 180°apart and averaged. Preferably, the ribs utilized in the measurement of lateral motion or lateral deflection are the outer ribs and next adjacent ribs thereto. The preferred four outer ribs, i.e. two shoulder (or outer ribs) and two next adjacent ribs, have been found to have the highest correlation to tread wear. However, depending upon the type of tread design only the outer (shoulder) ribs may provide adequate correlation.

The results of tests made by the present invention utilizing the apparatus described above is set forth in the following tables. Table I shows the average lateral rib motion for the outer ribs of the tire treads tested by the method of the present invention along with available tread wear data such as fleet tread wear data as well as trailer tread wear data. All of the tires of each letter designation are of basically the same construction eg. tires A12, A13, A14 and A15 are of the same construction. The following tests set forth a prediction of the relative tire wear one can expect from a specific tire construction. The test of the present invention does not take into account the wear characteristics of various tread compounds.

Figure 2:
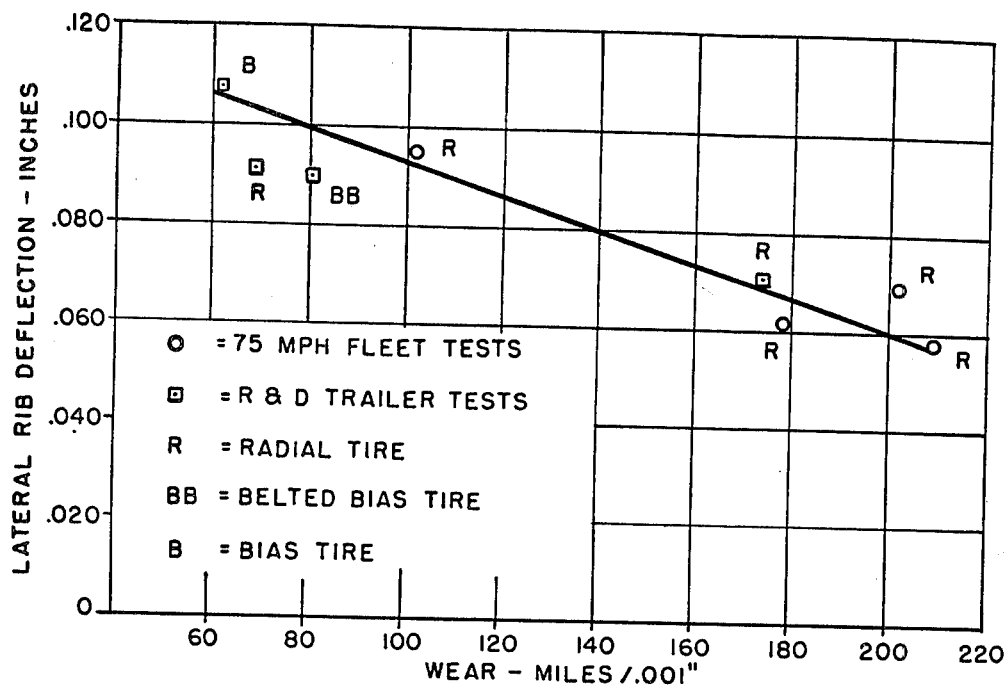
FIGS. 2 and 3 are graphical representations of the correlations between measured deflection and tread wear.
Figure 3:
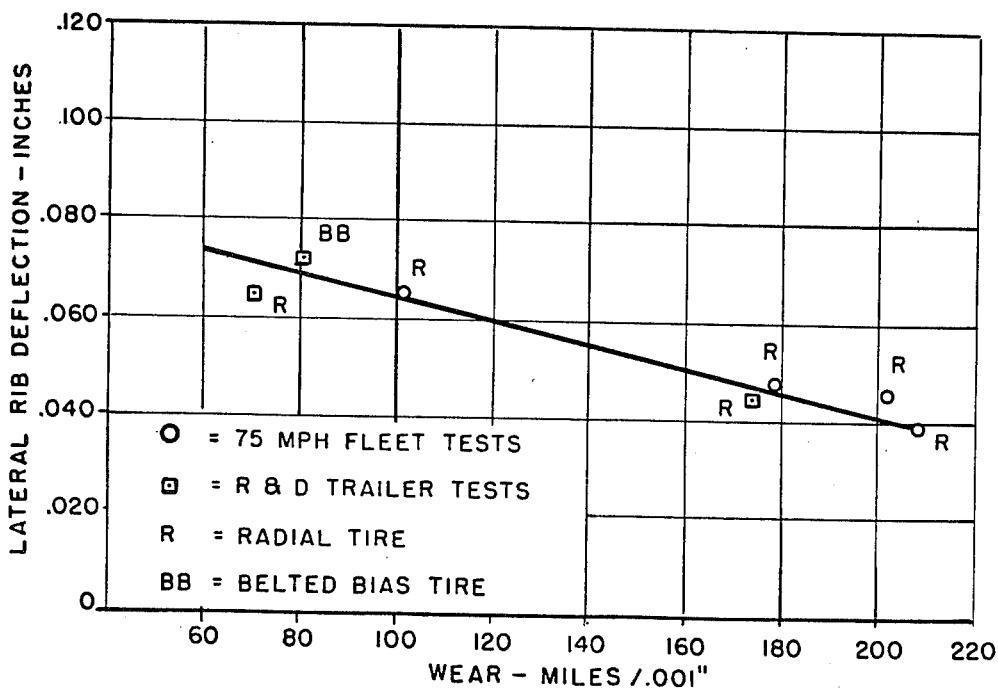

As can be seen from Table I certain tires were tested with a maximum radial load of 1000 pounds whereas other rated loads of 1380 pounds were utilized and data extrapolated from projected radial load versus lateral rib deflection curves. Utilizing the data of Table I the graphs of FIGS. 2 and 3 were prepared. FIG. 2 shows the relationship between the shoulder rib lateral motion and tread for the bias, belted bias, and radial tires tested. The straight line shown fits these points well. FIG. 3 shows that if the averages of the shoulder and adjacent ribs are compared with tread wear, the correlation is substantially improved. Accordingly, it is this average which comprises the preferred method of the present invention.

In Table II, tests were run on a belted bias tire and two radial tires. These same tires were also run on a tread wear trailer.

TABLE I

SUMMARY OF STATIC LATERAL RIB DEFLECTION AND FLEET AND TRAILER TREAD WEAR DATA

| Tire Construction | Tire | Radial Load Lb. | Shoulder Ribs In. | Adjacent Ribs In. | Average Outer Ribs In. | Tires | 75 mph Fleet Tread Wear Data Wear Miles/.001" Aver. Outer Grooves | Tires | R&D Trailer Tread Wear Data Wear Miles/.001" Aver. All Ribs |
|---|---|---|---|---|---|---|---|---|---|
| 8.25-14 Bias | M5 | 1,000 | .088 | — | — | | | M5&6 | 42.1 |
| | M5 | 1,380* | .108 | — | — | | | | |
| G-78-14 Glass | N3 | 1,000 | .079 | .053 | .066 | | | N3&4 | 80.3 |
| Belted Bias | N3 | 1,380* | .090 | .053 | .072 | | | | |
| G78-15 Glass | A12 | 1,380 | .104 | .049 | .077 | | | | |
| Belted Bias | A13 | 1,380 | .109 | .051 | .080 | | | | |
| | A14 | 1,380 | .096 | .043 | .069 | | | | |
| | B49 | 1,380 | .097 | .057 | .077 | | | | |
| | B52 | 1,380 | .104 | .065 | .085 | | | | |
| | B53 | 1,380 | .108 | .047 | .077 | | | | |
| FR-70-14 Radial 4-Ply Rayon Belt | A12 | 1,280 | .091 | .038 | .065 | A14&15 | 102 | A12&13 | 69.7 |
| FR-70-14 Radial 4 Ply Rayon Belt | B26 | 1,280 | .062 | .031 | .047 | B14&30 | 179 | | |
| FR-70-14 Radial 2 Ply 9 × 1 Wire Belt | C28 | 1,280 | .058 | .018 | .038 | C16&35 | 209 | | |
| FR-70-14 Radial 2 Ply 4 × 1 Wire Belt | D34 | 1,280 | .070 | .020 | .045 | D22&23 | 202 | D34&37 | 174 |

*Data for 1,380 pound load extrapolated from lateral rib deflection versus radial load.

TABLE II

STATIC LATERAL RIB DEFLECTION TESTS
Measurements Made at 24 psi and 1,000 Pounds Radial Load

| Tires | Size | Rib 1 | 2 | 5 | 6 | Average |
|---|---|---|---|---|---|---|
| N-3 Glass Belted Bias | G-78-14 | .085 | .050 | .056 | .073 | .066 |
| A-12 Radial | FR-70-14 | .096 | .051 | .050 | .094 | .073 |
| Tires C 28 | FR-70-14 | .072 | .018 | .016 | .069 | .044 |

Ribs 1, and 6 are shoulder ribs and ribs 2 and 5 are adjacent ribs.

The results of the trailer tests show that the belted bias tire is slightly better than the radial tire. This same conclusion is shown in Table III. Table III shows a summary of some of the parameters utilized. Two tires reported in Table II also appear in Table III. These results, however, cannot be compared because minor modifications were made during the test.

TABLE III

STATIC AND DYNAMIC LATERAL RIB DEFLECTION TESTS AND FOOTPRINT PRESSURE MEASUREMENTS
All Measurements Made at 24 psi and 1,280 Pounds Radial Load FR-70-14 Tires from W.A. 17178.009

| Tires | Test | 1 | 2 | Rib 5 | 6 | Average |
|---|---|---|---|---|---|---|
| A-12 | Static- in. | .102 | .037 | .040 | .080 | .065 |
|  | Dynamic- in. | .094 | .038 | .035 | .072 | .060 |
|  | Pressure- psi | 12 | 43 | 36 | 24 | 29 |
| B-26 | Static- in. | .063 | .028 | .034 | .062 | .047 |
|  | Dynamic- in. | .026 | .009 | .009 | .015 | .015 |
|  | Pressure- psi | 29 | 32 | 33 | 30 | 31 |
| C-28 | Static- in. | .055 | .018 | .017 | .060 | .038 |
|  | Dynamic - in. | .033 | .014 | .008 | .029 | .021 |
|  | Pressure- psi | 45 | 26 | 29 | 51 | 38 |
| D-34 | Static- in. | .066 | .020 | .019 | .074 | .045 |
|  | Dynamic - in. | .029 | .015 | .012 | .020 | .019 |
|  | Pressure- psi | 49 | 4 | 25 | 38 | 29 |

As can be readily seen, the data on static lateral rib deflections correlated with tread wear.

While presently preferred method and apparatus have been described and shown in particularity, the invention may otherwise be embodied within the scope of the appended claims.

I claim:

1. An apparatus for qualitatively determining relative tread wear of pneumatic tires comprising:
   a. a flat bearing surface plate having an opening therethrough:
   b. a pair of spaced apart depending bearing members mounted to the nonbearing surface of said bearing plate and in spaced away aligned relation to said plate opening;
   c. a pair of deflection members, one end of each deflection member being secured to a different bearing member;
   d. a movable follower member positioned within said plate opening to contact the tread of a tire resting on the plate and secured to each of said previously nonsecured ends of each deflection member; said follower being pivoted to prevent motion in the radial direction of the tire but to allow the translation of lateral motion; and
   e. a strain gauge or gauges mounted on at least one of said deflection members and capable of detecting the lateral deflection of the movable follower member.

2. An apparatus for qualitatively determining relative tread wear of pneumatic tires as set forth in claim 1 wherein:
   said movable follower member includes a surface in substantially planar alignment with the bearing surface of said bearing plate.

3. An apparatus for qualitatively determining relative tread wear of pneumatic tires as set forth in claim 1 wherein:
   the deflection members are U-shaped.

4. An apparatus for qualitatively determining relative tread wear of pneumatic tires as set forth in claim 3 wherein:
   said U-shaped members are secured to their respective bearing members and said movable follower member in the same plane.

5. A method for predictive qualitative, nondestructive determination between at least two pneumatic tires which method comprises:
   a. radially loading a first pneumatic tire, inflated to a given pressure, such that the tread of said tire bears against a surface having means permitting the lateral deflection of at least an outer rib of said tread;
   b. measuring the lateral deflection of at least an outer rib of said tread of said tire in response to said radial loading in a);
   c. radially loading at least a second pneumatic tire, inflated to a given pressure, such that the tread of said at least second tire bears against a surface having means permitting the lateral deflection of at least an outer rib of said at least second tire tread at substantially the same load and inflation pressure as the first tire;
   d. measuring the lateral deflection of at least an outer rib of said tread of said at least second tire in response to said radial loading in c); and
   e. comparing the measurements of steps b) and d) the correspondingly greater the predictated tread wear rate.

6. The method defined in claim 5 wherein the measurement of step (b) includes measuring the lateral deflections of at least two outer ribs of said tread in response to said radial loading in (a) and averaging said at least two measurements of lateral deflection.

7. The method of claim 5 wherein the measurement of step (b) includes measuring said at least an outer rib twice, said measurements being taken about 180° from each other, and averaging said two measurements of said at least an outer rib.

8. The method of claim 5 wherein the at least two pneumatic tires differ in tread design.

9. The method of claim 5 wherein the at least two pneumatic tires differ in ply construction.

10. The method of claim 5 wherein at least two pneumatic tires differ in belt design.

* * * * *